(12) United States Patent
Kawasaki et al.

(10) Patent No.: US 7,137,466 B2
(45) Date of Patent: Nov. 21, 2006

(54) ARRANGEMENT STRUCTURE FOR FUEL CELL SYSTEM IN VEHICLE

(75) Inventors: Satoshi Kawasaki, Kawachi-gun (JP); Katsumi Saito, Shioya-gun (JP); Kazunori Fukuma, Kawachi-gun (JP)

(73) Assignee: Honda Motor Co., Ltd., Tokyo (JP)

( * ) Notice: Subject to any disclaimer, the term of this patent is extended or adjusted under 35 U.S.C. 154(b) by 301 days.

(21) Appl. No.: 10/703,916

(22) Filed: Nov. 6, 2003

(65) Prior Publication Data

US 2004/0101745 A1 May 27, 2004

(30) Foreign Application Priority Data

Nov. 12, 2002 (JP) ............................. P2002-328114

(51) Int. Cl.
*B60L 8/00* (2006.01)
(52) U.S. Cl. .................... 180/65.3; 180/291; 280/784
(58) Field of Classification Search .............. 180/65.3, 180/311, 312, 89.17, 291, 299; 280/784, 280/785
See application file for complete search history.

(56) References Cited

U.S. PATENT DOCUMENTS

| 5,193,635 A | * | 3/1993 | Mizuno et al. ............ 180/65.3 |
| 5,641,031 A | * | 6/1997 | Riemer et al. ............. 180/65.3 |
| 5,681,057 A | * | 10/1997 | Whirley et al. ............. 280/784 |
| 5,794,979 A | * | 8/1998 | Kasuga et al. ............. 280/834 |
| 6,203,099 B1 | * | 3/2001 | Iwatsuki ..................... 296/204 |
| 6,354,261 B1 | * | 3/2002 | Lassiter .................. 123/198 D |
| 6,378,637 B1 | * | 4/2002 | Ono et al. ................. 180/65.3 |
| 6,426,158 B1 | * | 7/2002 | Pratt et al. .................... 429/13 |
| 6,766,873 B1 | * | 7/2004 | Chernoff et al. ........... 180/65.1 |
| 6,782,914 B1 | * | 8/2004 | Kami et al. ................. 137/312 |
| 6,899,194 B1 | * | 5/2005 | Chernoff et al. ............ 180/311 |
| 6,916,563 B1 | * | 7/2005 | Yamamoto et al. ........... 429/17 |
| 6,953,099 B1 | * | 10/2005 | Kawasaki et al. ......... 180/65.1 |

FOREIGN PATENT DOCUMENTS

| JP | 08-192639 | 7/1996 |
| JP | 2001-113960 | 4/2001 |
| JP | 2001-313056 | 11/2001 |
| JP | 2001-339808 | 12/2001 |
| JP | 2001-351657 | 12/2001 |
| JP | 2002-2310 | 1/2002 |

* cited by examiner

*Primary Examiner*—Christopher P. Ellis
*Assistant Examiner*—Brian Swenson
(74) *Attorney, Agent, or Firm*—Hamre, Schumann, Mueller & Larson, PC (57) ABSTRACT

An arrangement structure for a fuel cell system in a vehicle including a fuel cell box which holds a fuel cell, a sub-frame which holds a fuel gas tank, and a fuel gas dilution box. The sub-frame is placed so as to be aligned with the fuel cell box, and the fuel gas dilution box is disposed between the fuel cell and the sub-frame.

2 Claims, 9 Drawing Sheets

FIG. 10B

ARRANGEMENT STRUCTURE FOR FUEL CELL SYSTEM IN VEHICLE

Priority is claimed to Japanese application No. 2002-328114, filed Nov. 12, 2002, which is incorporated herein by reference.

BACKGROUND OF THE INVENTION

1. Field of the Invention

The present invention relates to an arrangement structure for a fuel cell system in a vehicle.

2. Description of Related Art

In a fuel cell vehicle including a fuel cell system which supplies power to an electric motor for driving the vehicle, a structure capable of absorbing energy generated when the vehicle collides is adopted as in other various types of vehicles. For example, in Japanese Patent Application, First Publication, No. Hei 8-192639, a structure is disclosed in which a side member is made into a shape that can be easily bent and deformed in an upward direction and a fuel cell box which holds a fuel cell disposed on the side member is also made into a shape that can be easily bent and deformed in an upward direction so that energy generated by a collision can be absorbed by bending and deforming the side member and the fuel box and further rupturing the fuel cell.

However, in the above collision energy absorbing structure, the cost of repairing the vehicle after the collision would high since the collision energy is absorbed by rupturing fuel cells which are expensive.

SUMMARY OF THE INVENTION

Accordingly, an object of the invention is to provide an arrangement structure for a fuel cell system in a vehicle by which the costs necessary for repairing the vehicle after a collision can be reduced.

In order to achieve the above object, a first aspect of the present invention provides an arrangement structure for a fuel cell system in a vehicle, including a fuel cell box (for instance, a fuel cell box 39 explained in the following embodiment) which holds a fuel cell (for instance, a fuel cell 38 explained in the following embodiment); a sub-frame (for instance, a sub-frame 22 explained in the following embodiment) which holds a fuel gas tank (for instance, hydrogen tanks 29 and 30 explained in the following embodiment), the sub-frame being placed so as to be aligned with the fuel cell box; and a fuel gas dilution box (for instance, a dilution box 53 explained in the following embodiment) which is disposed between the fuel cell and the sub-frame.

According to the above arrangement structure for a fuel cell system in a vehicle of the first aspect of the invention, since the fuel gas dilution box is disposed between the fuel cell in the fuel cell box and the sub-frame which holds the fuel gas tank, collision energy transmitted to the sub-frame when the vehicle collides is sufficiently absorbed by deformation of the fuel gas dilution box. Accordingly, it becomes possible to prevent the fuel cell from being damaged, and hence the costs necessary for repairing the vehicle after the collision can be reduced.

A second aspect of the present invention provides an arrangement structure for a fuel cell system in a vehicle as set forth in the above first aspect, further including a stay (for instance, a stay 56 explained in the following embodiment) which is fixed to the fuel gas dilution box, the stay including a base portion (for instance, a base portion 54 explained in the following embodiment) having a fragile structure.

According to the above arrangement structure for a fuel cell system in a vehicle of the second aspect of the invention, since the base portion of the stay has a fragile structure, the stay will be ruptured or deformed to absorb displacement when the vehicle collides and parts which are supported by the stay fixed to the fuel gas dilution box, are relatively displaced. Accordingly, it becomes possible to prevent force from being locally applied to the attachment position of the stay fixed to the dilution box.

BRIEF DESCRIPTION OF THE DRAWINGS

Some of the features and advantages of the invention have been described, and others will become apparent from the detailed description which follows and from the accompanying drawings, in which:

FIGS. 8A and 8B are diagrams showing a side view of main parts of an arrangement structure for a fuel cell system in a vehicle according to an embodiment of the present invention, and FIG. 8A shows a state before a collision and FIG. 8B shows a state after the collision;

FIGS. 9A and 9B are diagrams showing a plan view of main parts of an arrangement structure for a fuel cell system in a vehicle according to an embodiment of the present invention, and FIG. 9A shows a state before a collision and FIG. 9B shows a state after the collision; and FIGS. 10A and 10B are diagrams showing a cross-sectional view of a stay of an arrangement structure for a fuel cell system in a vehicle according to an embodiment of the present invention, and FIG. 10A shows a state before a collision and FIG. 10B shows a state after the collision.

DETAILED DESCRIPTION OF THE INVENTION

The invention summarized above and defined by the enumerated claims may be better understood by referring to the following detailed description, which should be read with reference to the accompanying drawings. This detailed description of particular preferred embodiments, set out below to enable one to build and use particular implementations of the invention, is not intended to limit the enumerated claims, but to serve as particular examples thereof.

Hereinafter, the arrangement structure for a fuel cell system in a vehicle according to an embodiment of the present invention will be described with reference to the accompanying drawings. Note that the words "front", "back (rear)", "right", and "left" used in this specification mean "front", "back (rear)", "right", and "left" with respect to the traveling direction of a vehicle.

A fuel cell which is provided with the fuel cell system includes a solid polymer electrolyte membrane, and an anode and a cathode which are located at sides of the membrane. In the fuel cell, electrical power is directly derived from chemical energy generated by a redox reaction between hydrogen gas (i.e., fuel gas) supplied to the anode and air (i.e., oxidizing gas) supplied to the cathode. The fuel cell system includes, in addition to the fuel cell, a hydrogen tank (a fuel gas tank) which stores hydrogen gas to be supplied to the fuel cell, and an air-compressor which supplies air to the fuel cell. The fuel cell system further includes a dilution box (a fuel gas dilution box) which mixes hydrogen gas that is discharged when a purging process of water remaining at the anode or of nitrogen contaminating the hydrogen gas is carried out, with air exhausted from the cathode so that the concentration of hydrogen is reduced.

Figure 1:
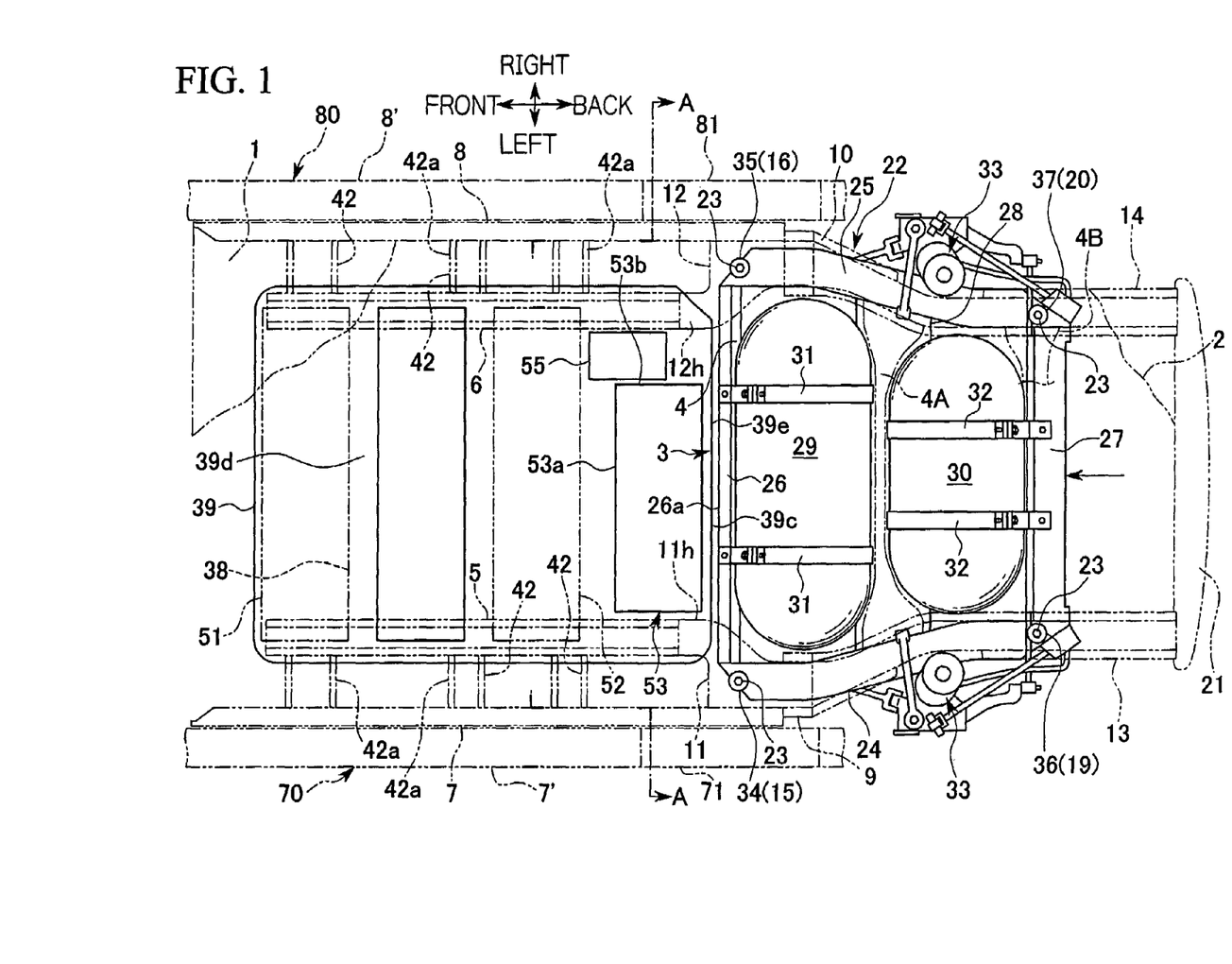
FIG. 1 is a diagram showing a plan view of an arrangement structure for a fuel cell system in a vehicle according to an embodiment of the present invention.
Figure 2:
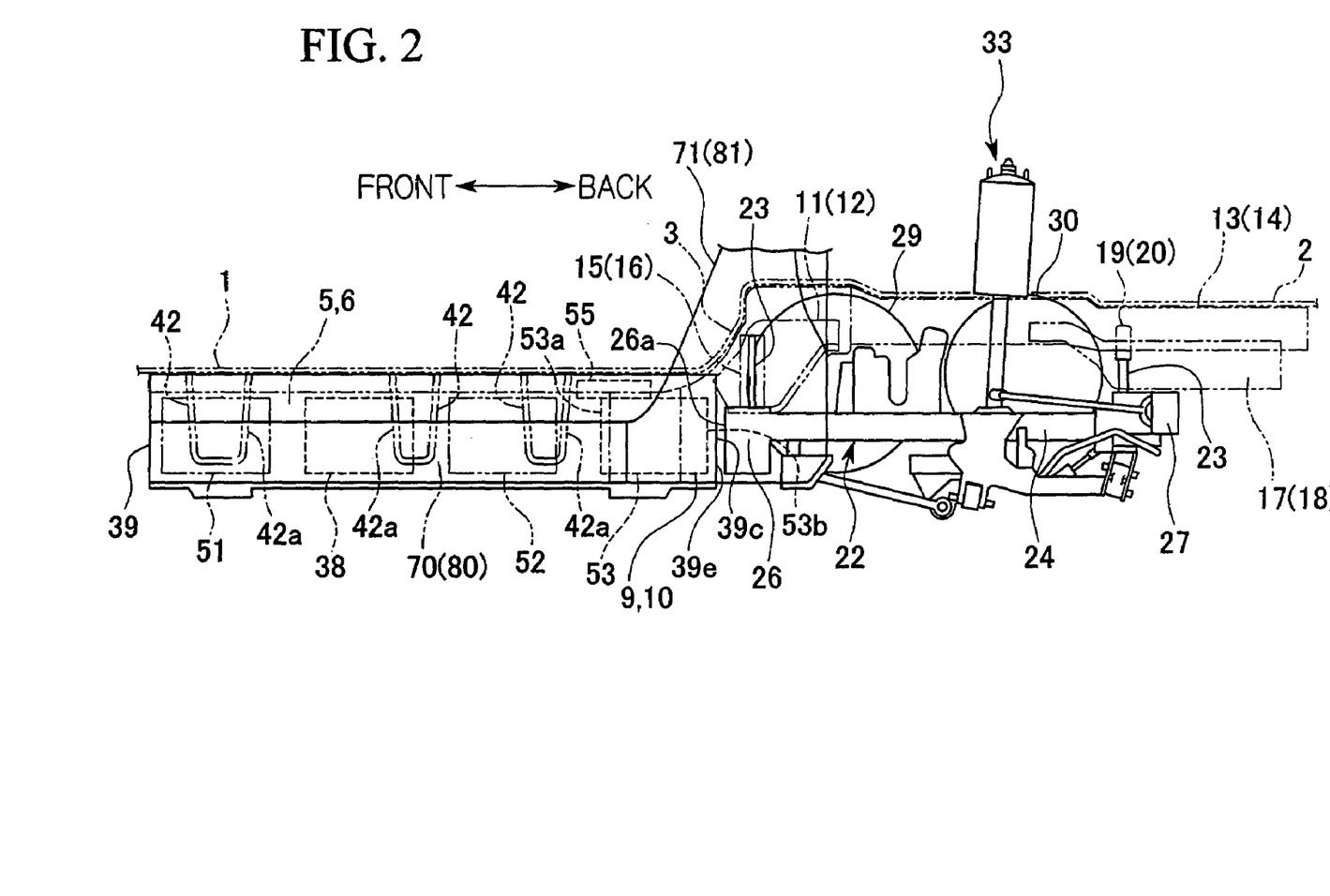
FIG. 2 is a diagram showing a side view of an arrangement structure for a fuel cell system in a vehicle according to the embodiment of the present invention.
Figure 3:
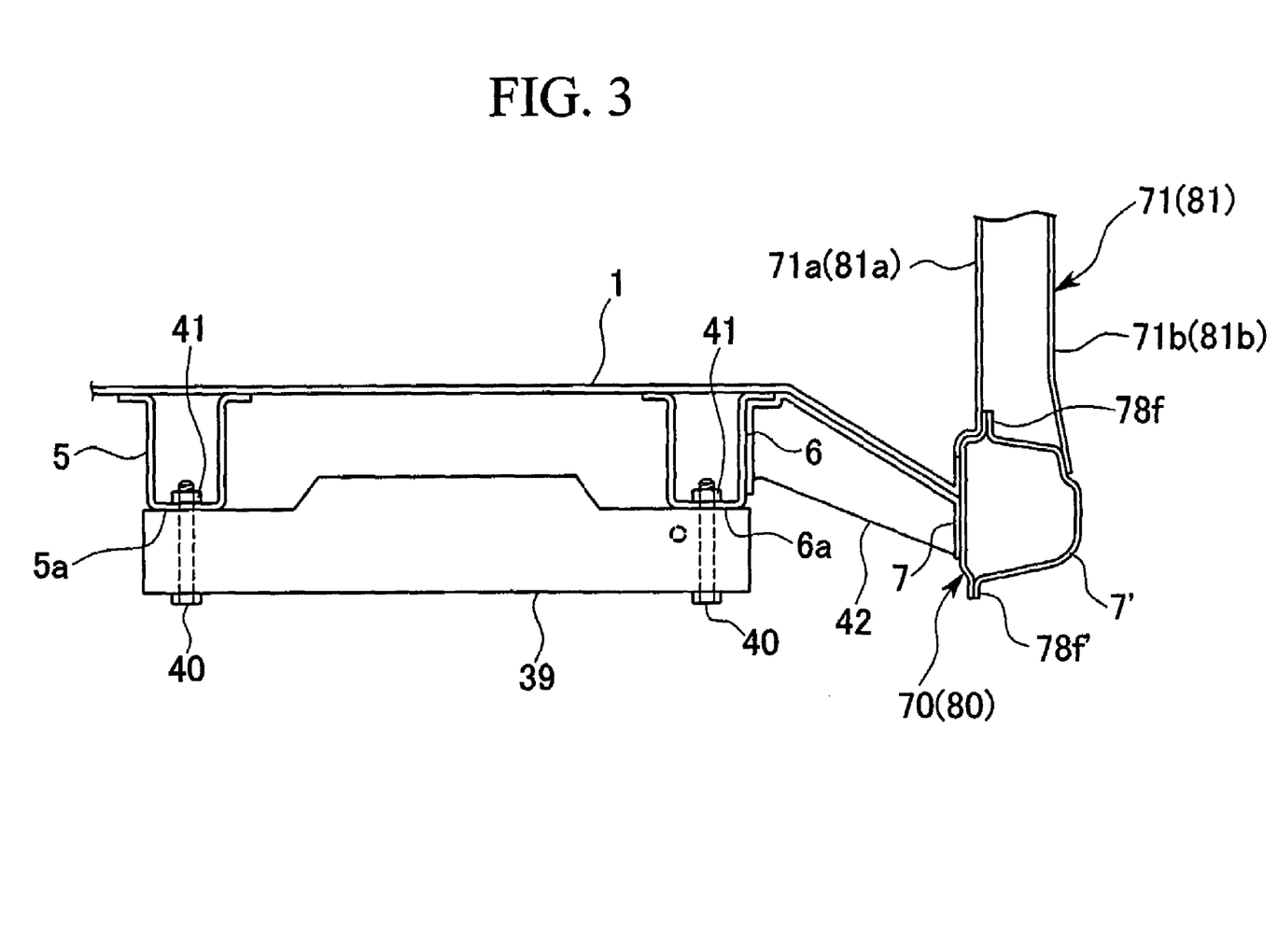
FIG. 3 is a diagram showing a cross-sectional view of an arrangement structure for a fuel cell system in a vehicle according to the embodiment of the present invention taken along the line A—A shown in FIG. 1.

As shown in FIGS. 1 through 3, a rear floor 2 having a step which is formed so as to be uplifted at the back is joined to a rear end of a front floor 1. A cross member 4 which forms a part of the framework of a vehicle is welded at the bottom of a step portion 3 of the rear floor 2 over the width direction of the vehicle. A pair of floor frames 5 and 6 that also form a part of the framework of the vehicle are connected to the bottom surface of the front floor 1 at the left hand side and right hand side thereof, respectively, along the longitudinal direction of the vehicle.

A pair of inside sills 7 and 8 are connected to Lie right and left hand side edge portions, respectively, of the front floor 1, and inside sill extensions 9 and 10 are attached to the rear edge portion of the inside sills 7 and 8, respectively. Also, outside sills 7' and 8' are welded to the inside sills 7 and 8, respectively, to form each of side sills 70 and 80 that form the framework of the vehicle.

Figure 4:
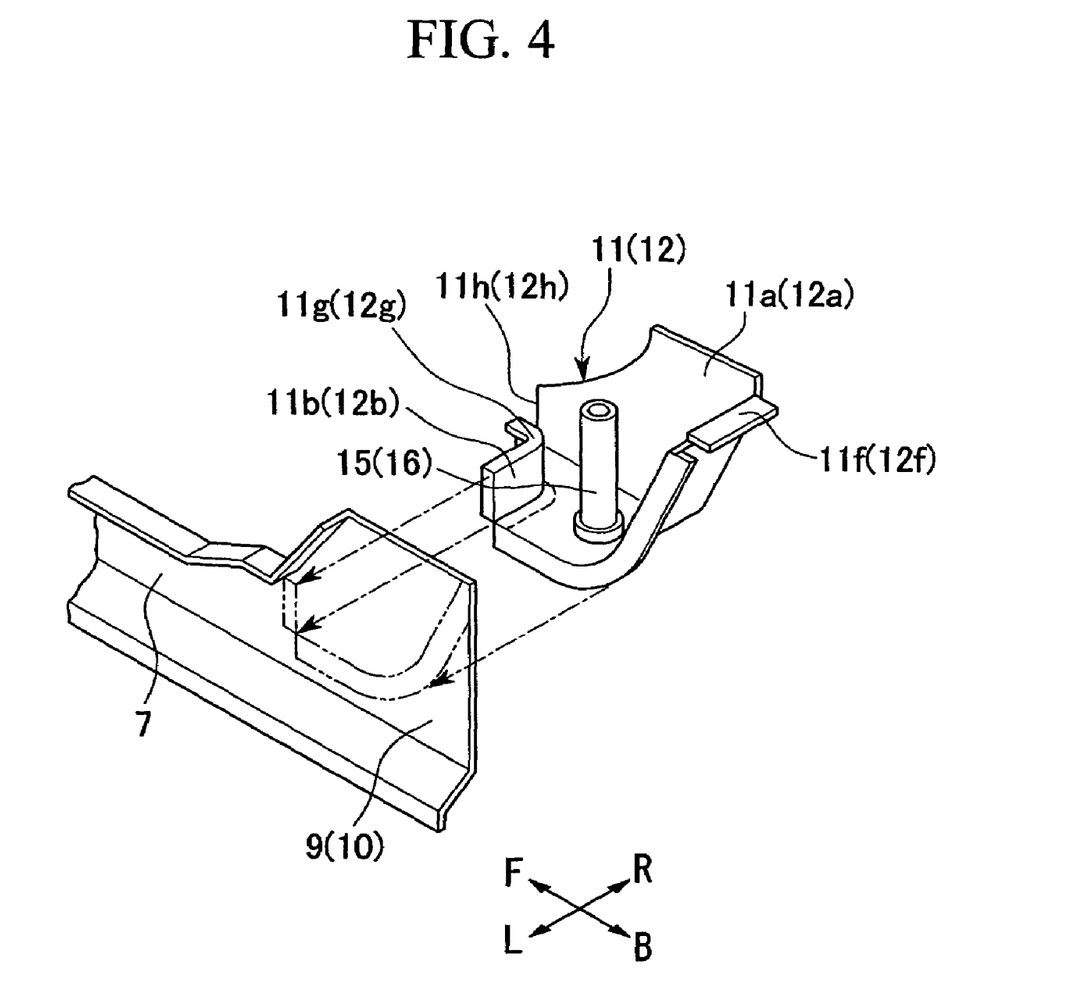
FIG. 4 is a diagram showing a perspective view of a front bracket which may be used in an embodiment according to the present invention.

As shown in FIG. 4, front brackets 11 and 12 are attached to an inside surface of the inside sill extensions 9 and 10, respectively. Note that in FIG. 4, only the inside sill extension 9 and the front bracket 11 located at the left hand side are shown, and the inside sill extension 10 and the bracket 12 are indicated by corresponding numerals shown in the parentheses.

A flange portion 11f (12f) of rear upper end of the front bracket 11 (12) is attached to a bottom wall of a rear frame 13 (14), which will be explained later, and a flange portion 11g (12g) is attached to a lower surface of the cross member 4. Also, a front wall 11b (12b) extends in a front direction together with an inner wall 11a (12a) to become a front frame connection portion 11h (12h) and attached to the floor frame 5 (6). Moreover, a collar nut 15 (16) is provided with the bottom wall of the front bracket 11 (12). Here, the rear frame 13 (14) is a member which is attached to the lower surface of the rear floor 2 and forms the framework of the vehicle.

Accordingly, a front end portion of the rear frame 13 (14) is connected to the side sill 70 (80) and the floor frame 5 (6) via the front bracket 11 (12).

As shown in FIG. 2, rear brackets 17 and 18 having a cross-section opened upwardly, are attached to the lower surface of the rear edge portion of the rear frames 13 and 14, respectively. Side walls of each of the rear brackets 17 and 18 are attached to the outside of side walls of the rear frames 13 and 14, and collar nuts 19 and 20 are provided with the bottom wall of the front portion.

In this embodiment, as shown in FIG. 1, two cross members 4A and 4B are provided so as to connect the left and right hand side rear frames 13 and 14, and a bumper beam 21 is attached to a rear edge portion thereof, i.e., to a rear edge of the rear brackets 17 and 18.

Also, a sub-frame 22 is fixed to the front brackets 11 and 12 and the rear brackets 17 and 18 by screwing a bolt 23 into each of the collar nuts 15, 16, 19, and 20 from the bottom.

The sub-frame 22 includes a cross-beam 28 which is a member formed in a rectangular shape by right and left frame members 24 and 25 and front and back frame members 26 and 27 and extends in the width direction of the vehicle, and two hydrogen tanks (fuel gas tanks) 29 and 30 are disposed at a respective position separated by the cross-beam 28 being tightened and fixed by bands 31 and 32, respectively. Also, a suspension unit 33 is attached to the sub-frame 22, and a tire, which is not shown in the figure, is attached to the suspension unit 33. In this embodiment, each of the hydrogen tanks 29 and 30 has a cylindrical shape, both ends of which are closed by a spherical shape member.

In addition, insertions 34 and 35 for the bolts 23 which are inserted into the above collar nuts 15 and 16 are provided at corners formed by the front edge of the left and right frame members 24 and 25 and both ends of the front frame member 26. Likewise, insertions 36 and 37 for the bolts 23 which are inserted into the above collar nuts 19 and 20 are provided at corners formed by the rear edge of the left and right frame members 24 and 25 and both ends of the rear frame member 27.

Accordingly, the sub-frame 22 is fixed to the rear frames 13 and 14 by inserting the bolt 23 into each of the insertions 34, 35, 36, and 37 of the sub-frame 22 formed in the manner as mentioned above, and screwing the bolt 23 into the collar nuts 15, 16, 19, and 20, which are provided with the front brackets 11 and 12 and the rear brackets 17 and 18 of the rear frames 13 and 14. In this embodiment, the front frame member 26 of the above-mentioned sub-frame 22 includes a flat surface 26a at the front thereof.

As shown in FIG. 3, a fuel cell box 39 in which a fuel cell 38, etc., is accommodated, is disposed below the front floor 1 so as to extend over the above-mentioned left and right floor frames 5 and 6.

Figure 5:
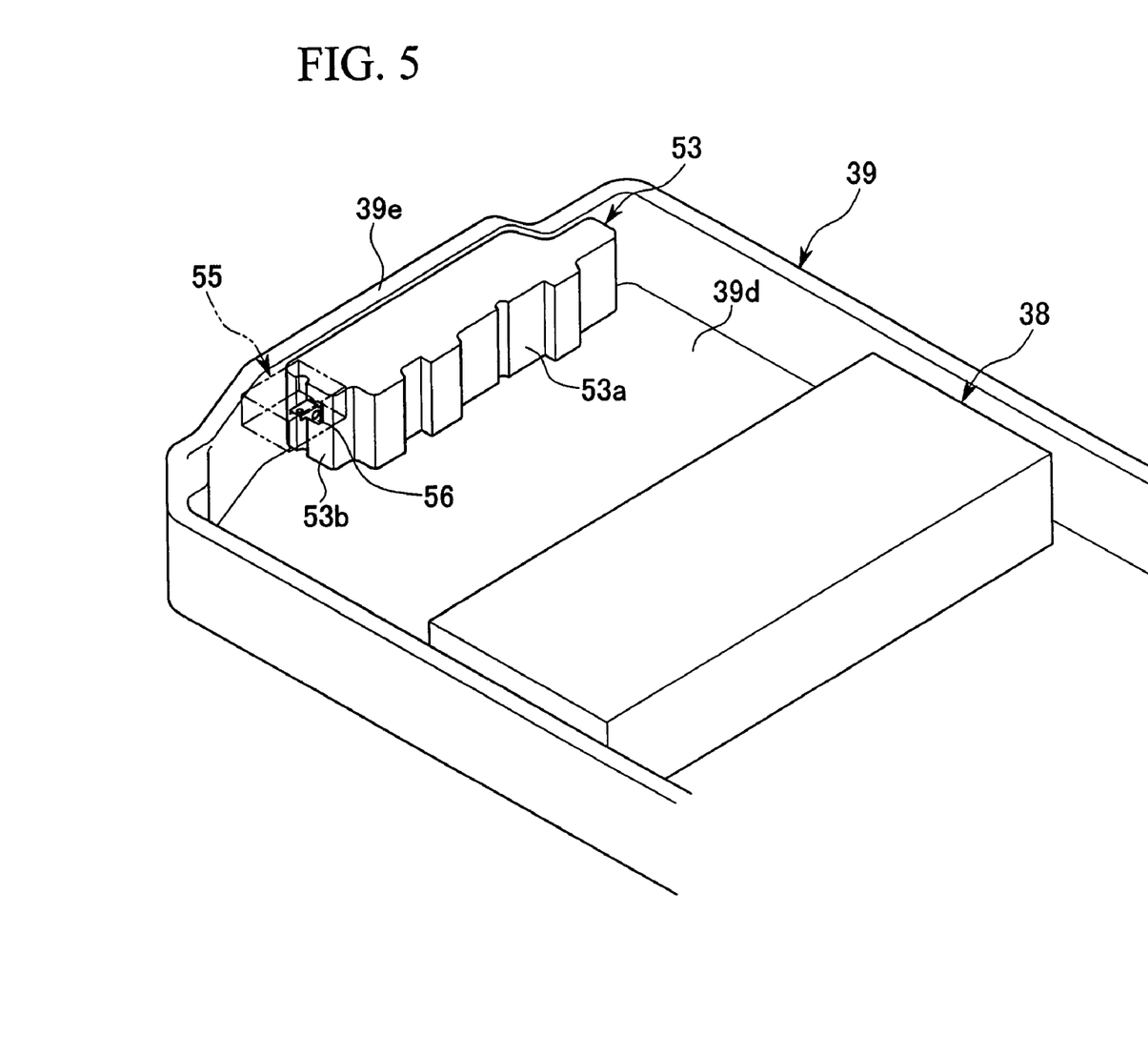
FIG. 5 is a diagram showing a perspective view of main parts of an arrangement structure for a fuel cell system in a vehicle according to an embodiment of the present invention.

As is also shown in FIG. 5, the fuel cell box 39 has a structure capable of mounting the fuel cell 38 on a bottom plate 39d thereof and covering the side directions thereof. The fuel cell box 39 is fixed to the bottom walls 5a and 6a of the floor frames 5 and 6, respectively, by the bolt 40 and nut 41 with its opening facing in the upward direction as shown in FIG. 3. Note that the rear surface of the fuel cell box 39 is made into a flat surface 39c as shown in FIG. 2. The fuel cell box 39 having the above configuration and the above-mentioned sub-frame 22 (i.e., the front frame member 26) are disposed close to each other with the flat surface 39c at the rear of the fuel cell box 39 facing the flat surface 26a at the front of the sub-frame 22.

Each of the center pillars 71 and 81 is disposed at a position, viewed from the side of the vehicle, extending from the back of the fuel cell box 39 over the front of the sub-frame 22. More specifically, as shown in FIG. 3 which shows the left side of the body structure of the vehicle (note that the right hand side thereof is indicated only by numerical numbers in parentheses), the inside sill 7' (8') and the outside sill 7' (8') are welded to the flange portion 78f and 78*f* at the upper and the lower ends thereof to form the side sill 70 (80) as a structure having a closed cross-section. The inside pillar 71*a* (81*a*) is welded to the upper flange portion 78*f* and the outside pillar 71*b* (81*b*) is welded to the outside surface of the outside sill 7' (8'), and the inside pillar 71*a* (81*a*) and the outside pillar 71*b* (81*b*) form the center pillar 71 (81) as the framework of the vehicle.

In this embodiment, three brackets 42 at one side, hence six at both sides, are welded to portions between the left and right floor frames 5 and 6 and the inside sills 7 and 8. The bracket 42 includes a flange portion 42*a* which is connected to the floor frames 5 and 6, the inside sills 7 and 8, and the back of the front floor 1.

In the above-mentioned manner, the fuel cell box 39 which accommodates the fuel cell 38, and the sub-frame 22 which holds the hydrogen tanks 29 and 30 are disposed so as to be aligned in the longitudinal direction of the vehicle. More specifically, the fuel cell box 39 is disposed at the front and the sub-frame 22 is disposed at the back.

In this embodiment, as shown in FIGS. 1 and 2, accessories 51 for the fuel cell 38, the fuel cell 38, accessories 52 for the fuel cell 38, and the above-mentioned dilution box (i.e., the fuel gas dilution box) 53 are fixed, in that order, from the front, on the bottom plate 39*d* of the fuel cell box 39. In this manner, the dilution box 53 is disposed at the sub-frame 22 side with respect to the fuel cell in the fuel cell box 39.

The fuel cell 38 has a substantially rectangular shape, and it is fixed to the bottom plate 39*d* of the fuel cell box 39 so that the longer sides thereof align in the width direction of the vehicle.

The dilution box 53 also has a substantially rectangular shape, and it is fixed to the bottom plate 39*d* of the fuel cell box 39 so that the longer sides thereof align in the width direction of the vehicle. In addition, the dilution box 53 is fixed to the fuel cell box 39 in a state such that it contacts with a wall portion 39*e* at the rear of the fuel cell box 39 so that no space is present therebetween. A wall portion 53*a* disposed at a front and a wall portion 53*b* facing the width direction of the vehicle, of the dilution box 53, have a rugged surface as shown in FIG. 5.

An electrical-parts packaging box 55 for an electrical control unit (ECU) etc., which control the fuel cell 38, is attached to the wall portion 53*b* of the dilution box 53 via a stay 56. A base portion 54 of the stay 56 shown in FIGS. 6 and 7 located at the side to be attached to the dilution box 53 has a fragile structure which is easily inclined and deformed, especially in the back and forth direction of the vehicle.

Figure 6:
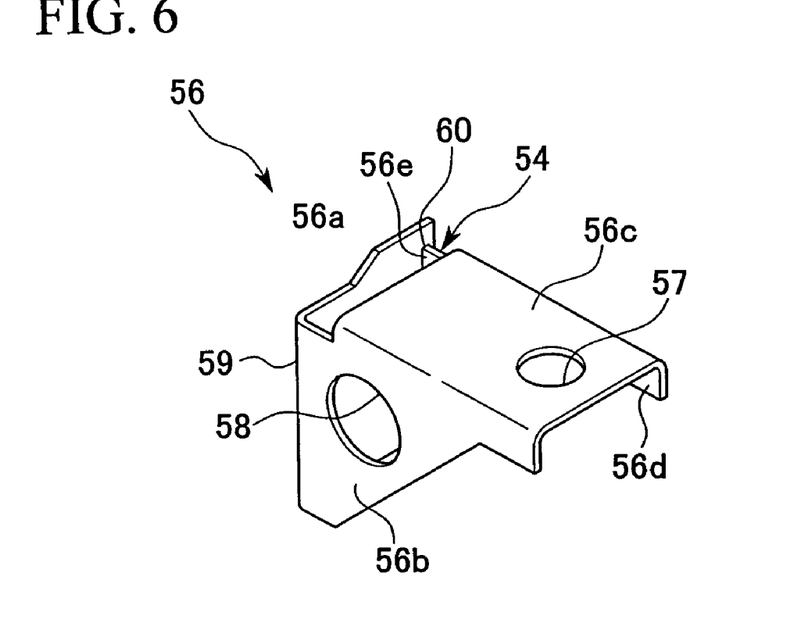
FIG. 6 is a diagram showing a perspective view of a stay which is used in an arrangement structure for a fuel cell system in a vehicle according to an embodiment of the present invention.
Figure 7:
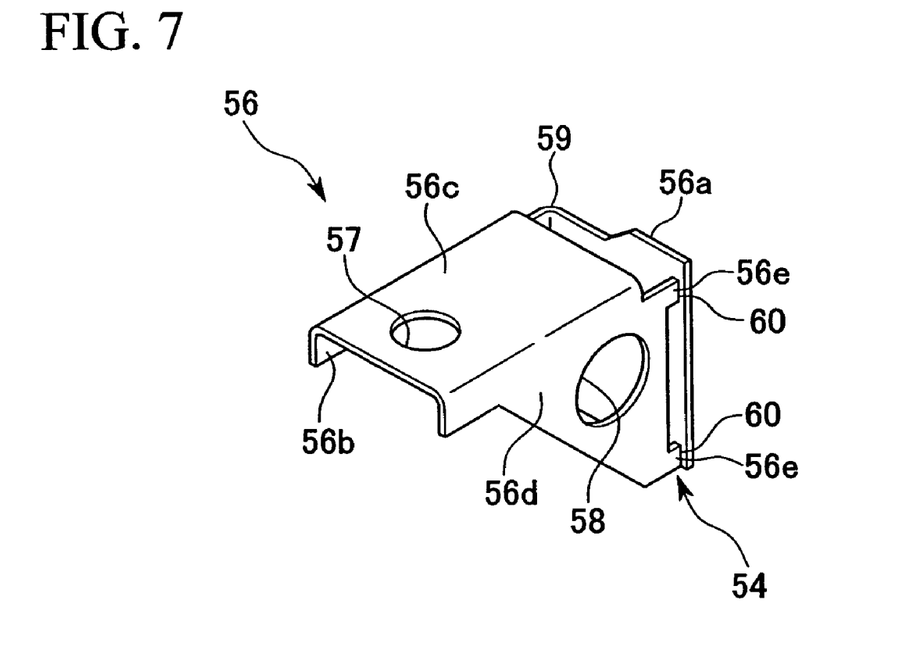
FIG. 7 is a diagram showing another perspective view from a different angle of the stay which is used in an arrangement structure for a fuel cell system in a vehicle according to an embodiment of the present invention.

More specifically, the stay 56 has a fixing plate portion 56*a*, a side plate portion 56*b*, an attachment plate portion 56*c*, another side plate portion 56*d*, and protruded portions 56*e*. The face of the fixing plate portion 56*a* is fixed to the wall portion 53*b* of the dilution box 53 by welding, etc. The side plate portion 56*b* extends from the periphery of one side of the fixing plate portion 56*a*, and has a substantially triangular shape. The attachment plate portion 56*c* extends from an upper periphery of the side plate portion 56*b* to be bent horizontally in the same direction as the fixing plate portion 56*a*. The side plate portion 56*d* is bent in the downward direction so as to oppose the side plate portion 56*b*, and has a substantially triangular shape. Each of the protruded portions 56*e* protrudes towards the fixing plate portion 56*a* side from an upper and a lower position of a periphery of the side plate portion 56*d* facing the fixing plate portion 56*a* side, and contacts with the fixing plate portion 56*a*. A hole 57 is provided with the attachment plate portion 56*c*, and a hole 58 is provided with the side plate portion 56*b* and 56*d* so as to penetrate the portions 56*c*, 56*b*, and 56*d* in the thickness direction thereof. In this embodiment, the stay 56 is formed using a die to be shaped as mentioned above, and is subsequently subjected to a holding process.

The protruded portions 56 which contact the fixing plate portion 56*a* are welded to the fixing plate portion 56*a*. Also, the attachment plate portion 56*c* is separated from the fixing plate portion 56*a* so that space is present therebetween. In this embodiment, the above-mentioned base portion 54 of the stay 56 is formed by a bent portion 59 at the boundary between the fixing plate portion 56*a* and the side plate portion 56*b*, and each of the contact portions 60 which is welded in a state such that the fixing plate portion 56*a* contacts the protruded portions 56*e*. Note that the electrical-parts packaging box 55 is attached to the upper surface of the attachment plate portion 56*c* of the stay 56 using bolts, etc., via the hole 57 of the attachment plate portion 56*c*, and the electrical-parts packaging box 55 is supported by another stay (not shown in the figures) at the fuel cell box side 39 as well as by the stay 56 at the dilution box 53 side so as to be efficiently placed within the narrow space.

Accordingly, as explained above, when a load exceeding a design limit is applied to between the fixing plate portion 56*a* and the attachment plate portion 56*c* of the stay 56 in a direction that relatively moves the attachment plate portion 56*c* from the contact portion 60 to the bent portion 59, the protruded portions 56*e* which are welded to the fixing plate portion 56*a* and thus having a weaker binding strength, are easily disconnected from the fixing plate portion 56*a* (i.e., one of the base portion 54 is ruptured). As a result, since the binding state of the fixing plate portion 56*a* of the stay 56 is maintained only by the side plate portion 56*b* side which is supported by the bent portion 59 between the fixing plate portion 56*a* and the side plate portion 56*b*. Therefore, the side plate portion 56*b*, the attachment plate portion 56*c*, the side plate portion 56*d*, and the protruded portions 56*e*, as a whole, readily incline towards the fixing plate portion 59 around the bent portion 59 (i.e., the other base portion 54 is bent) when the above load is applied.

When the fixing plate portion 56*a* of the stay 56 having the directionality in rupture and in deformation is fixed to the wall portion 53*b* of the dilution box 53, it is positioned so that the contact portions 60 between the fixing plate portion 56*a* and the protruded portions 56*e* are readily separated when a force in a front direction is applied to the fixing plate portion 56*a* via the dilution box 53 which is moving in the front direction due to a collision when hit by another vehicle from behind while the movement of the attachment plate portion 56*c* is restricted. That is, the stay 56 is disposed so that the bent portion 59 is placed at the upstream side and the contact portion 60 is placed at the downstream side with respect to the relative displacement direction of the dilution box 53 and the fixing plate portion 56*a* in a collision. Note that the stay 56 including the base portion 54 has a strength sufficient to withstand and not be deformed by a load applied during a normal running state. The stay 56 having the above-mentioned shape has a high strength, particularly, in the up and down direction and the right and left direction.

Figure 8A:
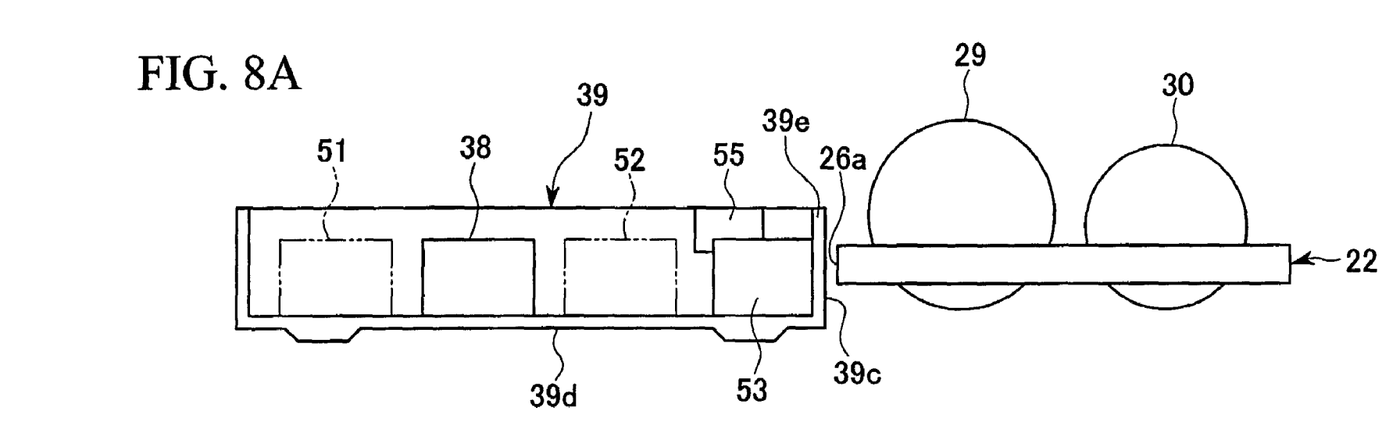
Figure 9A:
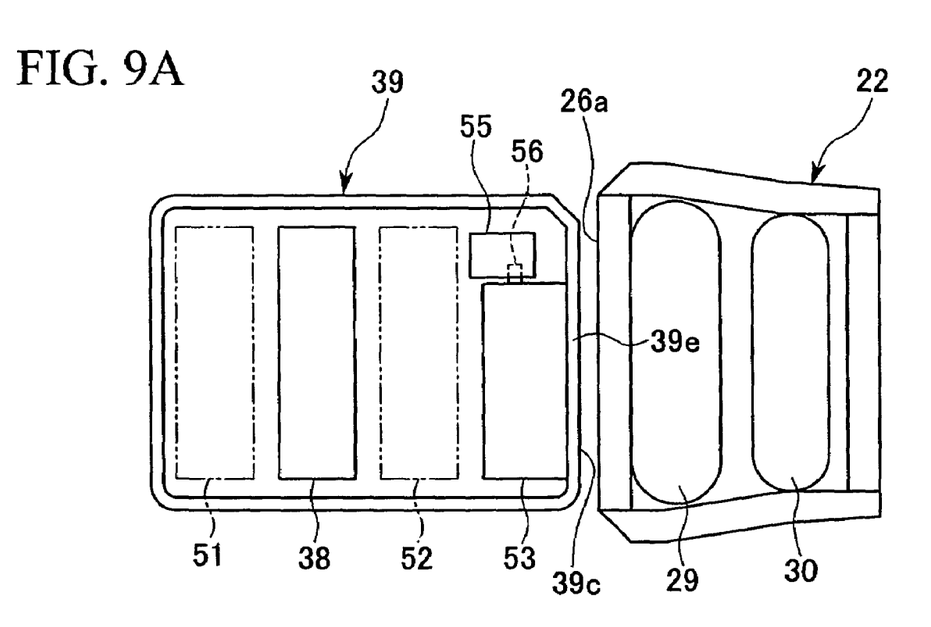
Figure 10A:
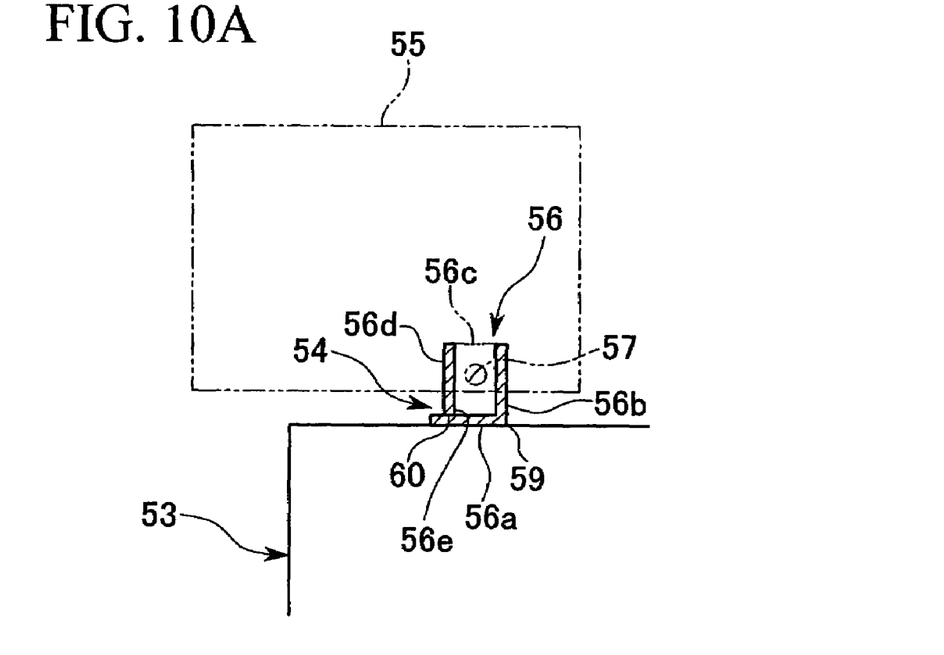

In the embodiment of the present invention having the configuration explained above, when the sub-frame 22 which protects the hydrogen tanks 29 and 30 is displaced from a normal state shown in FIGS. 8A, 9A, and 10A in a forward direction when hit by another vehicle from behind, the flat surface 26*a* of the frame member 26 located at the front of the sub-frame 22 functions to transmit the pressing force uniformly over the flat surface 39*c* of the wall portion 39e of the fuel cell box 39. Accordingly, the load is dispersed over the entire surface to prevent the fuel cell box 39 from being deformed.

Figure 8B:
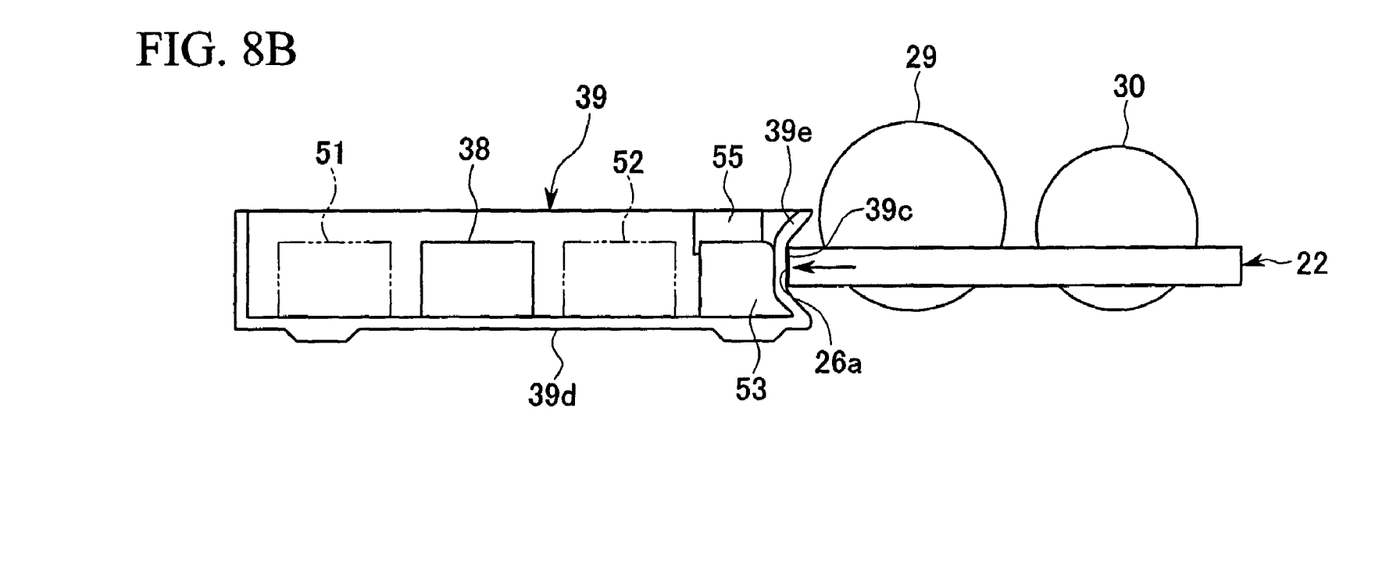
Figure 9B:
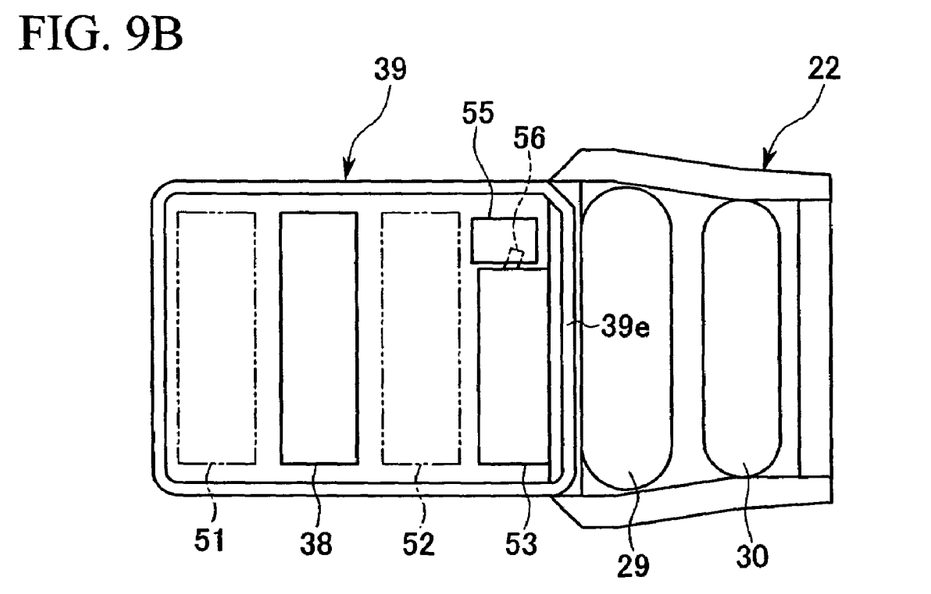

Moreover, when the sub-frame 22 is displaced in a forward direction by even larger collision energy, the sub-frame 22 deforms the wall portion 39e of the fuel cell box 39 and the dilution box 53 as shown in FIGS. 8B and 9B, and hence the collision energy is absorbed by the deformation of the wall portion 39e and the dilution box 53. In particular, since the dilution box 53 is closed and the closed state thereof is maintained after the deformation even though some change in volume may occur, the collision energy can be effectively absorbed. In this manner, it becomes possible to prevent the sub-frame 22 from reaching the fuel cell 38 located at the front of the dilution box 53.

Figure 10B:
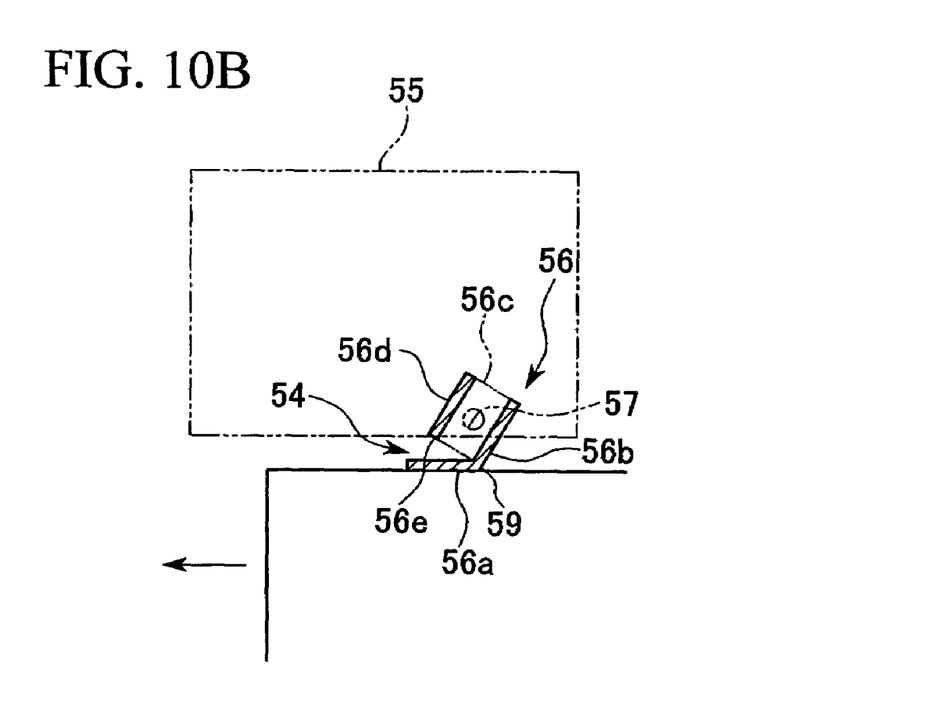

Also, when the sub-frame 22 is displaced so as to deform the dilution box 53 as mentioned above, the electrical-parts packaging box 55 disposed at a side is relatively displaced in a rear direction with respect to the dilution box 53 when the dilution box 53 is moved in a forward direction by the impact. Thus, the attachment plate portion 56c of the stay 56 which attaches the electrical-parts packaging box 55 to the dilution box 53 also relatively moves in a backward direction with respect to the fixing plate portion 56a fixed to the dilution box 53. Then, the contact portion 60 of the fixing plate portion 56a and the protruded portion 56e, which is welded in a state as shown in FIG. 1A, is separated as shown in FIG. 10B, i.e., the protruded portions 56e are readily separated from the fixing plate portion 56a so that the side plate portion 56b, the attachment plate portion 56c, the side plate portion 56d, and the protruded portions 56e are readily inclined towards the fixing plate portion 56a in a backward direction around the bent portion 59 at the boundary between the side plate portion 56b and the fixing plate portion 56a to displace the attachment plate portion 56c in a backward direction. That is, even when the dilution box 53 is moved in a forward direction due to a collision, the fixing plate portion 56a is readily moved in a forward direction while the position of the attachment plate portion 56c is maintained as it is. As a result, the degree of displacement of the fixing plate portion 56a with respect to the dilution box 53 to which it is connected can be kept small. Accordingly, no force is locally applied to the attachment position of the stay 56 to the dilution box 53, and it becomes possible to prevent breaking of the dilution box 53.

As explained above, according to the embodiment of the present invention, since the dilution box 53 is disposed between the fuel cell 38 in the fuel cell box 39 and the sub-frame 22 which holds the hydrogen tanks 29 and 30, energy which is generated by a collision and is applied to the sub-frame 22 when the vehicle is hit from behind can be sufficiently absorbed by the deformation of the dilution box 53. Accordingly, it becomes possible to prevent the fuel cell 38 from being damaged, and hence the cost which would be required for repairing the vehicle after the collision can be decreased.

Also, even if the above-mentioned relative displacement is caused to the electrical-parts packaging box 55 which is supported by the stay 56 fixed to the dilution box 53, the stay 56 is partially ruptured and deformed to absorb the displacement since the base portion 54 of the stay 56 is formed as a fragile structure. Accordingly, it becomes possible to prevent force from being locally applied to the attachment position of the stay 56 to the dilution box 53.

Having thus described exemplary embodiments of the invention, it will be apparent that various alterations, modifications, and improvements will readily occur to those skilled in the art. Such alterations, modifications, and improvements, though not expressly described above, are nonetheless intended and implied to be within the spirit and scope of the invention. Accordingly, the foregoing discussion is intended to be illustrative only; the invention is limited and defined only by the following claims and equivalents thereto.

What is claimed is:

1. An arrangement structure for a fuel cell system in a vehicle, comprising:
    a fuel cell box which holds a fuel cell;
    a sub-frame which holds a hydrogen tank, said sub-frame being placed so as to be aligned with said fuel cell box; and
    a fuel gas dilution box which is disposed between said fuel cell and said sub-frame, wherein
    said fuel gas dilution box mixes hydrogen gas, which is discharged when a purging process of water remaining at an anode or of nitrogen contaminating hydrogen gas is carried out, with air exhausted from a cathode so that concentration of hydrogen is reduced;
    said sub-frame is a member formed in a rectangular shape and said hydrogen tank is fixed thereto by a band, said sub-frame being fixed to a rear frame and including a flat surface at a front thereof;
    said fuel cell box is disposed below a floor so as to extend over left and right floor frames which are connected to the rear frame;
    said fuel cell box includes a flat surface at a rear thereof, said fuel cell box being disposed close to said sub-frame with the flat surface at the rear of said fuel cell box facing the flat surface at the front of said sub-frame; and
    said fuel gas dilution box is fixed to said fuel cell box in a state such that the fuel gas dilution box contacts a wall portion at the rear of said fuel cell box so that no space is present therebetween.

2. An arrangement structure for a fuel cell system in a vehicle according to claim 1, further comprising:
    a stay which is fixed to said fuel gas dilution box, said stay including a base portion having a fragile structure.

* * * * *